June 16, 1959

A. C. GRAELL 2,891,137

CONTROL CIRCUIT FOR ELECTRICAL DISCHARGE
METAL MACHINING APPARATUS
Filed March 8, 1957

INVENTOR.
A. Camprubi Graell
BY
ATTYS.

United States Patent Office 2,891,137
Patented June 16, 1959

2,891,137

CONTROL CIRCUIT FOR ELECTRICAL DISCHARGE METAL MACHINING APPARATUS

Alberto Camprubi Graell, Sabadell, Spain

Application March 8, 1957, Serial No. 644,937

Claims priority, application Spain February 23, 1957

9 Claims. (Cl. 219—69)

The present invention relates to a control circuit for the apparatuses intended to machine metals by means of erosion produced under electrical discharges in a dielectric liquid or other equivalent fluid.

The apparatuses and machines performing this kind of work are already well known, and several variations have been developed tending to improve several aspects of the performance thereof. There is, however, a great need for improvement in the suitable regulation of the discharge which removes the material which is being worked, and the purpose of the invention is to provide means substantially improving this aspect of the problem, thereby permitting regulation in a progressive manner of the discharge intensity, within wide limits, as distinguished from the known art, in which to date, the apparatuses of the disclosed kind have been regulated by the "on and off" method. The advantages derived from a progressive regulation are a greater working speed, since it eliminates the dead periods present in the on or off regulating method, and a greater accuracy in the machining obtained as a consequence of the ability of always providing the most suitable discharge intensity in accordance with the nature of the part being machined and the status or working stage being approached.

In accordance with the invention the control circuit comprises, in an apparatus consisting of an electrical power source connected, on the one hand with the part to be machined and, on the other hand with an electrode to be contacted with the said part, through a regulating resistor, the electrode being associated with a motor device contacting it with, or separating it from the said part, two valve devices provided with control members and connected on the one hand to one terminal of an electrical power source in a direct manner and, on the other hand with the other terminal through respective respective resistors shunted together by one of the windings of a reversible motor, the cathode or the like member of one said valve device being connected to the part to be machined and the control member with the electrode, while the cathode or the like member and the control member of the other valve device are connected to respective ends of the regulating resistance.

The connections of the control members with the remainder of the circuit elements can be provided through suitable voltage regulating devices, for example potentiometers or voltage dividers.

Other and further advantages of the invention will appear from a detailed discussion of an embodiment, in connection with the enclosed drawings cited by way of nonrestrictive example.

Figure 1:
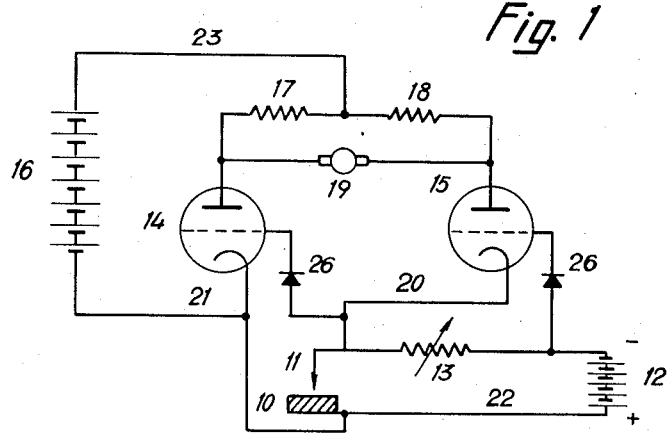
Figure 1 is a principle diagram of the circuit.

Taking as a basis for the description the diagram of Figure 1, it will be seen at 10 the part or workpiece to be machined and at 11 the electrode for the discharge, connected to respective terminals of the battery 12 through the adjustable resistor 13 intended to regulate the discharge intensity between the part and electrode. The two triodes 14, 15 have the cathodes thereof connected with the part and the electrode respectively, and the anodes thereof with the upper terminal of the battery 16 through the resistors 17, 18. The armature 19 of the electrode driving motor is connected across the anodes of these triodes. The field winding of this motor, not shown, may be independently energized in any known manner, and if necessary the field winding may be the element connected across the triodes while the armature is independently driven. In an alternative embodiment, the ohmic resistance produced by the elements 17, 18 may be provided by the motor field windings themselves which, in this instance, will be connected in place of the said resistors.

For the triode 14, the grid is connected to the working electrode while the grid of the triode 15 is connected to the input side of the load regulating resistance 13.

The bias voltages of the system being those indicated in the network, when the rod remains spaced apart from the part 10, the triode 15 conducts current, as the cathode and grid thereof are at the same potential while the grid of the triode 14 being more negative than the cathode of the same, this triode remains blocked. As a consequence a circuit is closed from the negative of battery 12, through resistor 13, lead 20, triode 15, resistor 18, battery 16, leads 21 and 22 to the positive of the battery 12. At the same time a current flows from the triode 15 to the battery 16 through the motor 19 and resistance 17, so that the motor revolves in the suitable direction to move the electrode towards the part.

Upon contact occurring between part and electrode, the potential difference between these two elements disappears so that the grid and cathode of the triode 14 are placed at the same potential and the tube becomes conductive. On the other hand, the working current produces a voltage drop in the resistor 13 and the grid of the triode 15 thereby becomes negative as regards the cathode of the same triode, so that this tube becomes blocked. In this condition the current flow takes place directly from the battery 16 through the lead 21, triode 14, resistor 17 and lead 23 again to the battery, and the motor driving current flows from the triode 14 through the motor 19, resistor 18, lead 23 and battery 16. It will appear that the current circulates in a direction reverse to that previously and, therefore, the motor tends to separate the electrode from the part.

Figure 2:
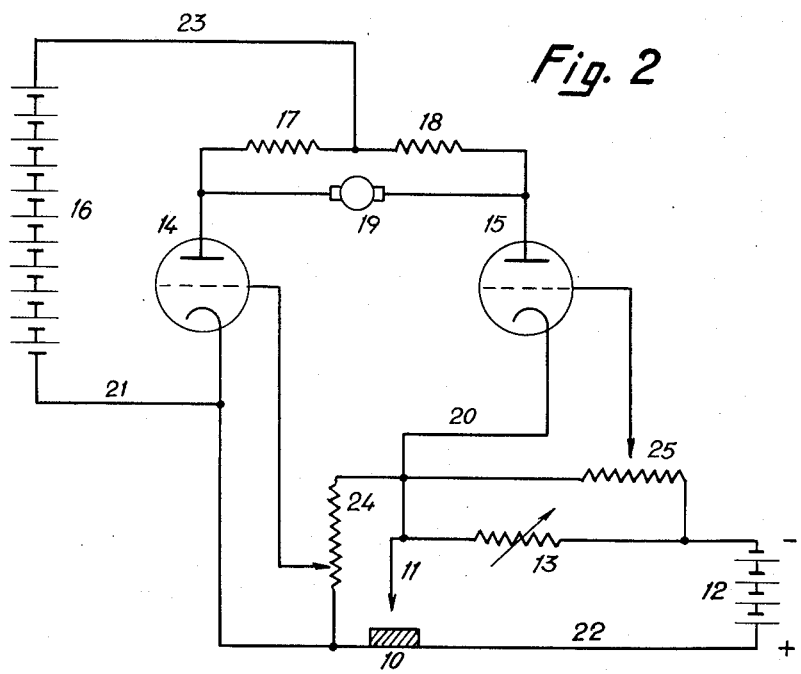
Figure 2 is a diagram including regulating potentiometers.

The performance of the network from the progressive regulation standpoint will be appreciated from Figure 2. In this case the sole variation introduced resides in the fact that the grid bias of the triodes 14, 15 is taken respectively from the potentiometers 24, 25, the first one shunted across the part and electrode, viz. the working arc, and the second one across the regulating resistance 13.

By suitably setting these potentiometers, a situation will be attained in which both the triodes will conduct simultaneously with exactly the same currents for a given condition of the arc taking place between electrode and part. Under these conditions, although both triodes are conducting, there is no current flow through the motor as both the ends thereof are at the same potential and, therefore it is stationary. However, in this condition of the network a slight unbalance between the reference resistance constituted by the resistance 13 and the potentiometer 25, and the resistance of the arc occurring between 10 and 11, will be sufficient to produce a variation in the current flowing through the triode 14, which will produce operation of the motor in the one or the other direction according to the direction of the variation, as will obviously be appreciated from the circuit.

The described control circuit can likewise operate with alternating current, that is, when in place of the battery 12 an alternating current source is used. In this case the operation of both triodes would be affected by the polarity changes occurring in the circuit comprising the electrode and part, and to obviate this, respective diodes 26 are inserted in the connections to the control grids, which diodes only allow passage of the current in the suitable direction for operation of the triodes. The same result can also be obtained with discriminator circuits.

Of course, instead of the triodes as diagrammatically illustrated, the network can also be based on tubes having a different number of electrodes, as well as on gas discharge tubes, to which end the necessary circuit variations for the bias and operation of the remainder of the electrodes, can be foreseen.

I claim:

1. In an electrical discharge metal machining apparatus having an electrode movable toward and from the workpiece to be machined and a reversible electromotive means for moving said electrode, a control circuit for said electromotive means controlled by the resistance of the arc between the electrode and workpiece comprising a source of voltage, a bridge network including a first pair of impedances connected in series across the source, a second pair of impedances, the movable electrode and the workpiece connected in series across the source in the order named, and means for connecting the electromotive device between the junctions of the two pairs of impedances, whereby a departure of the arc resistance from a predetermined value produces an unbalance voltage to drive the electromotive device.

2. In an electrical discharge metal machining apparatus in accordance with claim 1 in which one impedance of each pair of impedances comprises a grid controlled discharge tube.

3. In an electrical discharge metal machining apparatus in accordance with claim 1 in which one impedance of each pair of impedances comprises a grid controlled discharge tube, and an electrical circuit connected between the movable electrode and workpiece and controlled by the arc resistance to provide a differential bias on said control grids to vary the impedances of the bridge arms.

4. In an electrical discharge metal machining apparatus in accordance with claim 1 in which the electromotive device is a motor and the two impedances connected to one terminal of the source are the field windings of the motor.

5. In an electrical discharge metal machining apparatus in accordance with claim 3 in which the source of voltage is alternating current and rectifying means for rectifying the bias voltage applied to the control grids.

6. In an electrical discharge metal machining apparatus having an electrode movable toward and from the workpiece to be machined, a control circuit for moving said electrode comprising a pair of grid controlled discharge tubes, a bridge network having a pair of impedances connected together at one end to form a junction, the other ends of the impedances being connected respectively, to one electrode of a tube, a biasing circuit including means coupling the control grid and a second electrode of one tube across the movable electrode and workpiece, a first voltage source connected across the movable electrode and workpiece through a series resistor, a biasing circuit including means coupling the control grid and a second electrode of the second tube across the series resistor, a reversible motor for moving the movable electrode, means connecting said motor between the said one electrodes of the tubes, and a second voltage source connected between the junction and workpiece, whereby a change in the resistance of the arc between the movable electrode and workpiece from a predetermined value, varies the bias of the control grids to provide a differential voltage between said one tube electrodes to control said motor.

7. In an electrical discharge metal machining apparatus according to claim 6 in which the impedances constitute the field windings of the motor.

8. In an electrical discharge metal machining apparatus according to claim 6 in which at least one of said voltage sources is alternating current and rectifying means for rectifying the bias voltage produced by said first and second biasing circuits.

9. In an electrical discharge metal machining apparatus in accordance with claim 6 in which said coupling means includes variable impedances for varying the bias voltage.

References Cited in the file of this patent

UNITED STATES PATENTS

| | | |
|---|---|---|
| 1,920,803 | Nagashev | Aug. 1, 1933 |
| 2,534,958 | Deming | Dec. 19, 1950 |
| 2,752,469 | Price | June 26, 1956 |
| 2,794,109 | Martin | May 28, 1957 |